UNITED STATES PATENT OFFICE.

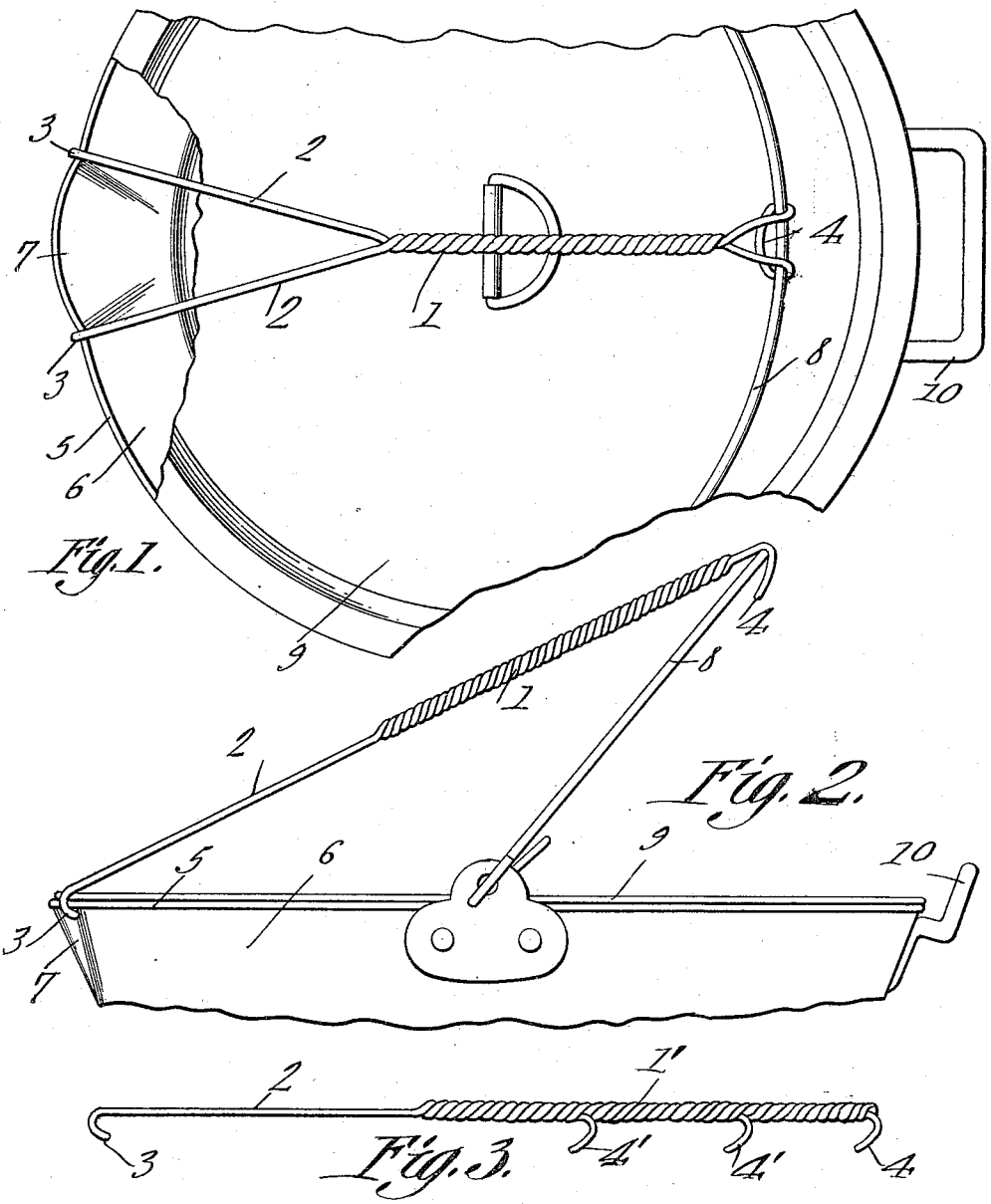

FREDERICK NEWELL MARTINDALE, OF GOUVERNEUR, NEW YORK.

COVER AND BAIL HOLDER FOR COOKING UTENSILS.

1,193,585. Specification of Letters Patent. Patented Aug. 8, 1916.

Application filed March 24, 1915. Serial No. 16,661.

*To all whom it may concern:*

Be it known that I, FREDERICK N. MARTINDALE, a citizen of the United States, residing at Gouverneur, in the county of St. Lawrence and State of New York, have invented a new and useful Cover and Bail Holder for Cooking Utensils, of which the following is a specification.

The present invention appertains to a device or attachment adapted to be applied to kettles and other cooking utensils or receptacles, and which is operable for effectively holding the cover of the vessel thereon and for holding the bail in a convenient position during the draining of the vessel.

It is the custom of housewives and cooks to drain potatoes and other vegetables by holding the cover upon the vessel by means of a towel, apron, or the like, and at the same time tilting or inverting the vessel so that the water will flow therefrom, but this method has constantly proven of disadvantage and annoyance since it is difficult to hold a heated kettle by the hands and at the same time to hold the cover in place upon the kettle in order that the vegetables will not escape.

A notable feature of the invention resides in the fact that the present implement or device may be easily and effectively applied to a vessel and its bail, for holding the cover upon the vessel during the draining operation, and whereby the bail is held in a convenient position relative to the handle or that portion of the vessel opposite the pouring spout, so that the handle or said portion and bail may be conveniently held by the hand for tilting or inverting the vessel to drain the water therefrom.

It is also within the scope of the invention to provide a device of the nature indicated, which is extremely simple and inexpensive in construction, which may be readily fashioned from wire or similar stock, which is provided with simple and effective means for applying it to the vessel and bail, and which will serve its office in a thoroughly practical and efficient manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a fragmental plan view of a vessel or cooking utensil illustrating the present device applied thereto. Fig. 2 is a side elevation thereof, a portion of the vessel being broken away. Fig. 3 is a side elevation of a modified form of the invention.

In carrying out the invention, the device or implement is fashioned from a single length of wire or other suitable stock, which is doubled and bent to provide a twisted shank 1, having diverging prongs 2 projecting from one end to provide a fork. The prongs 2 are provided with terminal downturned hooks 3 constituting the ends of the wire, and the other end of the shank 1 is provided with a loop 4, constituting the intermediate portion of the wire, and bent downwardly to provide a hook.

In applying the device or implement to a cooking utensil or vessel, the hooks 3 are engaged to the rim or bead 5 of the vessel 6, preferably with the prongs or fork arms 2 astride the pouring spout 7 of the vessel, and the loop shaped hook 4 is engaged to the intermediate portion of the bail 8 of the vessel 9. The implement is of such size or length that when applied to the vessel and bail as above indicated, and as illustrated in Figs. 1 and 2, the bail 8 will be held in an inclined position, so as to be inclined away from the spout 7, and toward the handle 10 or that portion of the vessel diametrically opposite the spout 7. Then, the bail 8 and handle or corresponding portion 10 of the vessel may be conveniently grasped in the hand of the operator, which will enable the vessel to be readily tilted or swung to draining position, and the bail 2 being pressed toward the handle 10 will hold the device or implement tightly in place. The prongs or arms 2 will hold the cover 9 of the vessel in place thereon, during the pouring off of the water from the vessel, and the implement in connecting the spout portion of the vessel and the bail 8 will limit the movement of the bail 8 toward the handle 10, whereby the vessel may be properly and conveniently manipulated. The present implement may be readily applied to and removed from the vessel, as will be obvious, and it is of further advantage, since it may be applied to the vessel and bail as illustrated, for holding the bail above the edge or rim of the vessel, in order that the bail will not be heated by contact with the edge or rim of the heated vessel. In this use of the device, the hooks 3 may be applied to the handle 10 instead of the spout portion of the vessel, if desired, when it is desired to hold the bail 8 above the spout 7, instead of above the handle 10.

The present device may be constructed in various sizes or proportions, so as to be applicable to various vessels or cooking utensils, and may be plated or otherwise finished for purpose of wear and appearance.

In the modification illustrated in Fig. 3, the twisted wire shank 1' of the implement is provided with additional loop-shaped hooks 4' in connection with the terminal loop-shaped hook 4, whereby the hooks 4 and 4' will enable the implement to be applied to various sizes of vessels, for holding a bail at various angles above the cover or top of the vessel, as will be obvious.

Having thus described the invention, what is claimed as new is:

1. A cover and bail holder for vessels, constructed solely of a single length of doubled wire, the wire being twisted between its bend and terminals to provide a shank, the bend of the wire providing a loop at one end of the shank, said loop being bent to provide a hook to engage the bail of a vessel for supporting it in an inclined position, the terminal portions of the wire diverging from the other end of the shank to provide a fork, and the terminals of the wire being bent to provide hooks to engage the rim of the vessel astride the spout thereof, as and for the purposes set forth.

2. A cover and bail holder for vessels, constructed solely of a single length of doubled wire, the wire being twisted between its bend and terminals to provide a shank, the bend of the wire providing a loop at one end of the shank, said loop being bent to provide a hook to engage the bail of a vessel for supporting it in an inclined position, the terminal portions of the wire diverging from the other end of the shank to provide a fork, the terminals of the wire being bent to provide hooks to engage the rim of the vessel astride the spout thereof, the twisted portion of the wire being provided between the ends of the shank with an outstanding loop bent to provide a hook engageable with the bail of a smaller vessel.

In testimony that I claim the foregoing as my own, I have hereto affixed my signature in the presence of two witnesses.

FREDERICK NEWELL MARTINDALE.

Witnesses:
N. E. BROWN,
C. A. CARPENTER.